OR 3,849,729

United States Patent [19]

Van Baggem

[11] 3,849,729

[45] Nov. 19, 1974

[54] SYSTEM FOR DETERMINING THE LISTENING AND VIEWING HABITS OF WAVE SIGNAL RECEIVER USERS

[75] Inventor: Johannes Wilhelmus Van Baggem, Scherpenzeel, Netherlands

[73] Assignee: Intomart N.V., Hilversum, Netherlands

[22] Filed: Dec. 14, 1972

[21] Appl. No.: 309,885

[52] U.S. Cl. .................... 325/31, 346/37

[51] Int. Cl. .................... H04h 9/00

[58] Field of Search .......... 325/31; 178/DIG. 9, 13; 235/91 D, 92 T, 92 TF; 346/37

[56] References Cited

UNITED STATES PATENTS

| | | | |
|---|---|---|---|
| 2,947,858 | 8/1960 | Abbott | 325/31 |
| 2,958,766 | 11/1960 | Evans | 325/31 |
| 3,058,065 | 10/1962 | Freeman et al. | 325/31 |
| 3,126,513 | 3/1964 | Kamen | 325/31 |
| 3,148,245 | 9/1964 | Currey et al. | 325/31 |
| 3,397,402 | 8/1968 | Schneider | 325/31 |

*Primary Examiner*—Howard W. Britton
*Assistant Examiner*—Jin F. Ng
*Attorney, Agent, or Firm*—A. W. Breiner

[57] ABSTRACT

The invention relates to a system and device for recording the tuning and working condition of a radio or television set. A record codes the time of any channel change as well as data about operating time after the change. The coding is characterized by means of a series of binary tones identifying different reception channels and a digital indication of the time the set is in use, the recording only being active when the set is in use.

10 Claims, 3 Drawing Figures

H 11-26-71 due

Figure 1:
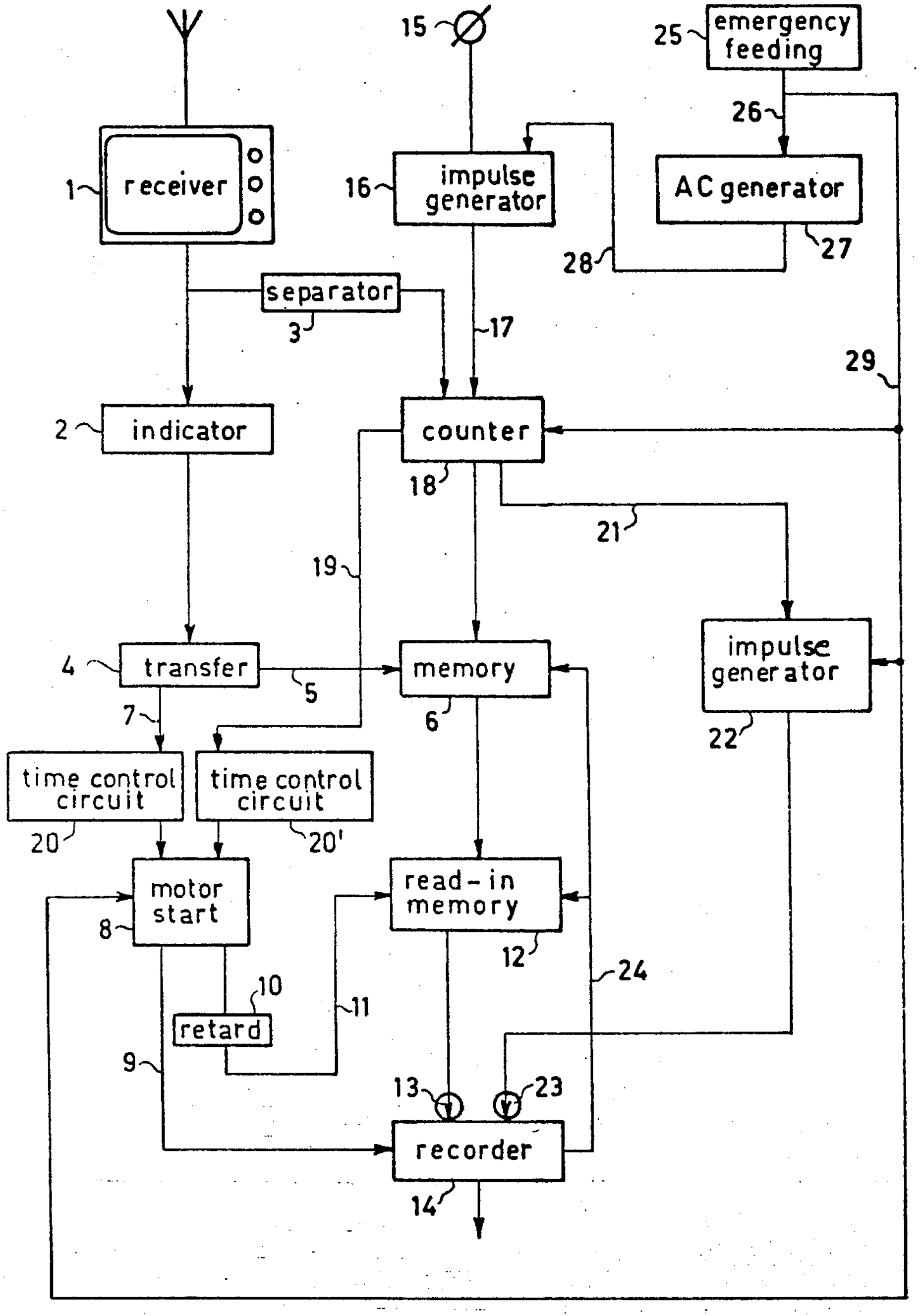

SYSTEM FOR DETERMINING THE LISTENING AND VIEWING HABITS OF WAVE SIGNAL RECEIVER USERS

The invention relates to a system for determining the listening- and viewing habits for radio and television receivers and suchlike, in which the tuning condition of the receiver is recorded on a recording medium. Such systems are already known in a number of forms. With an older proposal, described in the U.S. Pat. No. 3,397,402, assigned to the assignee of this application, the recording medium is started by combinations of low-frequency signals present in the audio portion of the television signal and with radio receivers in the radio signal itself. These signals are followed by a marker signal, that is recorded. Though the sound level of the signals can be very low, they still remain somewhat audible. With television receivers in some television systems, for instance as used in the Netherlands, the possibility exists to mix these signals with a higher audio frequency, for instance 15 3 kHz which is not reproduced by the loudspeaker. In this manner a system is obtained which will determine that at the moment these signals were transmitted the receiver was receiving the transmitter transmitting them. Further this system permits a reduced capacity of the recording medium while retaining sufficient accuracy.

According to an other known system a time synchronisation, derived from the transmitters, is recorded together with the tuning condition of the receiver. This system requires a continuously working recording device which in practice means either a very great length of the recording medium or a small accuracy.

The invention aims to provide a system with which it is possible to combine a high accuracy in the determining of the time with a rather small length of the recording medium and preventing faulty or distorted recordings.

The above object of the invention is obtained in that the time of turning of a predetermined transmitter or the time of switching-off of the receiver is recorded on the recording medium together with an indication of which transmitter was being received. Herewith the accuracy is high, because the recording (preferably digital) gives a time indication, which is not exclusively dependent on the location on the recording medium. Further with this system it is possible to maintain the advantages of a recording device, that only is made active, if a significant recording has to be made.

A further embodiment of the invention consists in that the recorded time of use is determined in the form of a number of digits indicating the number of predetermined time units that have passed during the measuring interval. The beginning of all measuring intervals is recorded. Herewith a counter needs only to count the time units that are present in a measuring interval. If this number is below 1024 with this way of recording a ten bit counter suffices. The measuring intervals should however also be identified on the recorder and because there are many less intervals than time units, this can be done by recording a marker at the beginning or another predetermined time during each measuring interval. In order to avoid disturbances with the other coded recordings, the time units can be recorded on a second recording trace of the recording device.

To record the measuring intervals by the number of time units during a measuring interval in a favourable way, the measuring intervals have a duration of the order of 10 minutes to one hour, preferably 15 minutes and the time units last a few seconds and preferably exactly one second.

Figure 2:
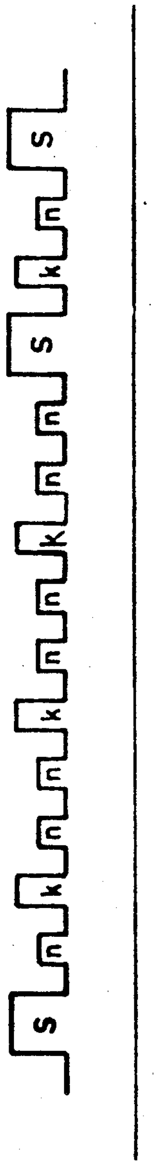

The invention is described by reference to the accompanying drawing, in which:

FIG. 1 shows in block diagram form a device to be used with the invention;

FIG. 2 diagrammatically shows the recording on the recording medium; and

Figure 3:
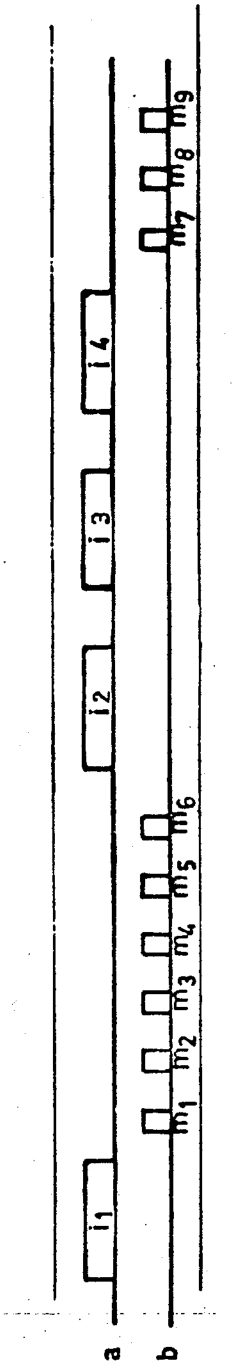

FIG. 3 shows a detail of FIG. 2 on a smaller scale.

In FIG. 1, reference 1 indicates a television receiver. This receiver is provided with an indicator 2 indicating the transmitter to which the receiver is turned and whether the transmission actually is received. The particular indicator 2 is of little importance to the invention and depends on the particular construction of the television receiver. In principle a connection can be made to the tuning members of the television set, it being also possible to use an electrical device reacting on the frequencies received, for instance the frequency of the mixing oscillator. In systems, in which the transmitters each continuously transmit an identification signal which can be filtered out, of course this signal can be used for identifying the transmitter. Further with the receiver a synchronisation separator 3 has been connected which serves for separating the synchronisation signals received from one or more transmitters.

The indicator 2 further is connected to a device 4 for indicating the condition of the receiver i.e. switched on or switched-off and when switched-in the identity of the transmitter received. The device 4 is adapted to pass with each change of condition the new condition immediately via line 5 to the memory 6. Further with the occurrence of a new condition of the indicator 2 a signal is carried by means of line 7 to a time control circuit 20 which during a predetermined period after receipt of a signal from line 7 activates a motor start circuit 8. This start circuit 8 connects working voltage to a recording device 14 having a motor for moving a record with two recording traces, for instance a movable record tape of a tape recorder, and via a time retardation device 10 and the line 11 a starting impulse is carried to the read-in memory 12. This read-in memory is connected to a first writing head 13 of the recording device 14, in this instance a two-trace tape recorder 14. The retardation serves the purpose to postpone recording on the tape until the tape has reached its normal travelling speed.

At 15 the device is connected to the power line frequency source and impulse generator 16 counts a predetermined number of mains cycles such as 50 , with a mains frequency of 50 Hz, for instance to generate one impulse each second. These impulses are carried by means of line 17 to a counter 18. This counter is adapted to count to 900. With the counting condition 449 an impulse is carried via line 19 to a time determining circuit 20', which activates the motor starting circuit 8 without activating the read-in memory via the retardation device 10. It will be clear that if the start circuit 8 was already active devices 12 and 14 are kept in the working condition, and the signal of line 19 only needs to cause a continuation of the activity of the starting circuit.

Via a further line 21 the counter 18 sends, when reaching the counting position 450, an activating impulse to the impulse generator 22, which after having been activated transfers a predetermined impulse to the writing head 23 of the second trace of the two trace recording device 14. The recording device 14 comprises reset means which issues after the completion of a recording a reset impulse via the line 24 to the read-in memory 12 and the memory 6 which pulse causes the read-in memory 12 to be cleared and is operable to cause the memory 6 to read-in at the relating bit locations the count of counter 18. Further the device contains an emergency power feeding unit 25 which may be of a normal type and for instance contains reloadable accumulators and a rectifier and only is switched-in if the voltage of the mains connection 15 disappears. The emergency feeding unit 25 is by means of line 26 connected to a generator 27 generating a voltage at the mains frequency. Generator 27 delivers via a line 28 voltage to the impulse generator 16 the main frequency. The emergency feeding unit 25 further is by means of line 29 connected to the impulse generator 22 and the motor starting circuit 8. Herewith the recording of the impulses of the generator 22 by means of the writing head 23 is maintained when the mains is cut-off.

Because generator 27 needs not to be exactly synchronous with the mains it is possible that with cut-off of the mains on connection 15 time shifts will occur. These are immediately compensated after the receiver again is active and a first synchronisation impulse is delivered by the synchronisation separator 3. These impulses accurately synchronise the counter when it is in the counting condition 900 and reset the counter in the starting position, independent of the momentary time shift condition of the counter. Consequently the timing of impulses of the generator 22 is synchronised with a standard time. A fault can occur by faulty interpretation of an impulse from generator 22. A faulty interpretation only will occur with a deviation of at least half a measuring interval, in the case considered 450 seconds or 7.5 minutes. Faults of 7.5 minutes are however extremely big and should not occur with the usual accuracy realized by the device. When actually using the invention it is preferred, that before taking the tape out of the recording device 14 a switching over to another transmitter is carried out, so that shortly before the tape is taken off a further recording occurs by means of the devices 6 and 12. Furthermore a record is made on the tape indicating the time at which this occurred.

When processing the record it is advantageous to read it in the reversed direction which means that one begins with the last record time. Because deviations of more than 7.5 minutes hardly are probable in this way, high reliability can be realized by reading back to the beginning of the tape, that is to say the time at which the tape had been inserted in the recording device. Herewith it is indicated that with the invention the tapes in general should be changed once a week, as is the case with many other systems.

The type of signals recorded can differ, but preferably impulses of a predetermined frequency are used. When processing the tape this yields the advantage, that the reading out device, preferably a central processing apparatus only needs to reject on predetermined frequencies if the tape moves with a predetermined velocity.

FIG. 2 shows an example of a record. Therewith the record is preceded by a starting impulse S, which preferably has its own frequency for instance 800 Hz. This starting impulse is followed by information bits corresponding to the condition of the counter 18 to wit in such a form that impulses of a first frequency, for instance 350 Hz indicated with $k$ are considered to be the information bit 1 and that impulses of another frequency, for instance 200 Hz are interpretated as the information bit 0. These latter are indicated by reference $n$. After this an impulse of the S-type of 800 Hz follows, which itself is followed by two information bits, in this example a $k$-bit and a $n$-bit relating to the code indication of the transmitter received. With two bits it is possible to identify three transmitters and the fact whether the receiver works or not. Further the fact that the receiver does not work indicates that shortly before it has been switched-off and also this information is useful to indicate the moment at which the receiver has been switched-off. Finally an end impulse S of 800 Hz follows. This last impulse is of great importance because with processing the data of the tape this is preferably read out in the reversed direction (which spares time) especially because not all tapes are completely used. With use of a cartridge tape it is possible to remove the cartridge in its final condition out of the recording device and to read it immediately in the reversed direction starting from the end condition. Which means that in the first instance the cartridge needs not to be reeled back and in the second instance that only that part of the cartridge, that indeed contains information, is overheard.

FIG. 3 shows the information on the tape on a smaller scale showing both traces $a$ and $b$. A complete information block of the type indicated in FIG. 2, that is to say a starting impulse, ten bits of the $k$ or $n$ type, again a starting impulse, again two bits of the $k$ or $n$ type and finally an end impulse of the same type as the starting impulse is indicated with a block $i$ (information), whereas on the other trace the coded identification time impulses $m$ developed by the generator 22 which are recorded by head 23 of recording means 14, that is to say the time measuring interval determining impulses have been indicated. In FIG. 3 at a predetermined time information is received. This is indicated with $i_1$. This information condition that for instance indicates turning to a predetermined transmitter is kept in force during six measuring intervals. In the following seventh measuring interval two times a change of transmitter has occurred after which the receiver has been switched-off. The times at which this happened in this interval with respect to occurrence of the last measuring interval impulse $m6$ can be read from the information of $i_2$ and $i_3$. The time recorded in the information block $i_4$ with respect to impulse $m_6$ indicates the time at which the receiver was switched-off.

OPERATION MODE

In operation the system of FIG. 1 serves to record the signals of FIGS. 2 and 3 in the manner now described. As the channel is changed or the receiver is switched off the change of condition is entered into the memory 6 and timer delay circuit 20 through transfer buffer circuit 4. The timer circuit 20 starts the recorder motor 8 and runs it long enough to make the recording following the change of condition and the further time delay 10 will serve to record the contents of memory 12 on the tape when advancing at full speed.

The time interval counter 18 is an accurate clock working from line frequency 15 or equivalent emergency source 27. The counter resets every 900 seconds to give a 15 minute capacity. Every 15 minutes at the mid count of 450 then the recorder is started temporarily by timer circuit 20' and a time impulse is recorded via generator 22 at head 23 on track b as shown in FIG. 3. The time at which the receiver is turned off or a channel is changed is recorded from memory 12 as received from counter 18 and memory 6 so that the 10 binary digits of FIG. 2 will display accurately the interval between the last time pulse on track 23 and the turn-off or switching time, and identify the status of the three channels or off condition of the receiver by the two separated binary digits, as encoded by the transfer circuit 4 into memory 6.

The counter 18 is set at a predetermined count for synchronisation purposes from a signal received on at least one of the receiver channels and processed through Sync separator circuit 3.

Thus while the recorder moves only enough to accurately record the necessary pulse data, the timing of use of any one of the three channels may be accurate down to one second by recording the starting and ending times and the elaspsed number of time units therebetween.

What I claim is:

1. A system for determining the listening and viewing habits of radio and television receiver users comprising in combination, recording means with a movable record, means connected to said recording means and one said receiver for recording a coded signal on the record identifying the turning channel of the receiver and operation condition and the identification times when switching-in of the receiver and switching-off of the receiver and changing channels, means for developing further signals comprising time measuring intervals of predetermined duration, means connected to said recording means for recording on said record said measuring intervals during the operation of the receiver by a signal identifying the number of time units elapsed since the last coded signal was recorded, and signal responsive recording moving means connected to detect both said coded signals and said time measuring intervals for moving the record for recording when either of said signals are present and for stopping the record when said signals are not being presented for recording, thereby presenting on the tape coded signals with the further time measuring signals therebetween indicating the time the tuning to a channel is kept in force.

2. System according to claim 1, in which the measuring intervals have a duration of the order of 10 minutes to an hour and that the time units have a duration in the order of a second.

3. System according to claim 1 in which the movable record contains two traces and means recording in one trace the measuring intervals and in the other trace the information relating to the tuning condition and the moments of switching-in and-off of the receiver.

4. A system according to claim 1 in which the means for recording provides with said coded signal an end impulse of predetermined frequency.

5. A system as defined in claim 1 wherein the means for developing and recording the time measuring intervals comprises a counter and a frequency source counted thereby, and means deriving said elapsed time signals from said counter.

6. A system according to claim 5 in which the counter is connected to the recording means to move the record each time a measuring interval has passed.

7. A system according to claim 1 wherein the means for recording the measuring intervals comprises a digital counter and wherein the system is provided wth a memory connected for receiving the count of the counter in digital form and further for receiving the tuning condition of the receiver, and means operable to transfer the count of the counter into the memory at said identification times, and a starting circuit responsive to a particular count of said counter for moving said record including a delay circuit connected to transfer the data of the memory to the moving record.

8. A system according to claim 7 in which the counter is connected to the motion starting circuit for making a recording each time a measuring interval has passed.

9. A system according to claim 8 in which the recording device has two recording traces and for each trace a writing head, the writing head of one trace being connected to record said measuring intervals.

10. A system according to claim 9 provided with means providing synchronisation signals connected to reset the counter to a predetermined count.

* * * * *